Jan. 30, 1940.  R. C. OLTMAN  2,188,543
BAKEPAN COVER
Filed May 12, 1937  2 Sheets-Sheet 1

Inventor
RAY C. OLTMAN
By Stanley Hood
Atty.

Jan. 30, 1940.  R. C. OLTMAN  2,188,543
BAKEPAN COVER
Filed May 12, 1937  2 Sheets-Sheet 2

Inventor
RAY C. OLTMAN
By Stanley Hoods
Att'y.

Patented Jan. 30, 1940

2,188,543

UNITED STATES PATENT OFFICE 2,188,543

BAKEPAN COVER

Ray C. Oltman, Pasadena, Calif., assignor to The Edward Katzinger Company, Chicago, Ill., a corporation of Illinois Application May 12, 1937, Serial No. 142,085

6 Claims. (Cl. 53—6)

This invention relates to covers for bakepans and has for its object the provision of an insulated cover adapted to restrict the expansion of the pan contents by direct contact therewith and at the same time produce a loaf having uniform crust characteristics throughout the top surface thereof.

With the above and other objects in view, as will be apparent, this invention consists in the construction, combination and arrangement of parts, all as hereinafter more fully described, claimed and illustrated in the accompanying drawings, wherein:

The cover forming the subject of this invention is designed for use in conjunction with baking pans to maintain the contents of the pan entirely within the limits of the walls thereof and to prevent any bulging of the pan contents above the horizontal plane through the upper edge of the pan. These covers act to produce a loaf that is substantially rectangular in cross-section. In the baking operation the dough within the pan rises and contacts with the inner surface of the cover causing the dough to spread out to create a uniformly flat top surface.

It has been found that these covers usually conduct the heat from the oven to the contents so rapidly that the central portion of the top surface of the contents obtains an overbaked crust during the interval that the contents undergo complete expansion into the corners of the pan. This causes the top of the load to obtain a crust of uneven color and texture. The present invention is designed to so space or separate the inner or dough contacting surface of the cover from the side thereof directly exposed to the oven heat so as to impede or retard the heat transfer therethrough. By thus shielding the inner surface of the cover, the dough is thoroughly protected against direct heat, causing a crust formation of uniform characteristics through the top surface thereof.

Reference being had more particularly to the drawings, 10 designates a series of pans secured together by a strap 11 (see Fig. 3) to create a unitary pan set. The present invention is illustrated as applied to a pan set consisting of several pans secured together, but it is to be understood that it can be as readily used in conjunction with a single pan.

Figure 1:
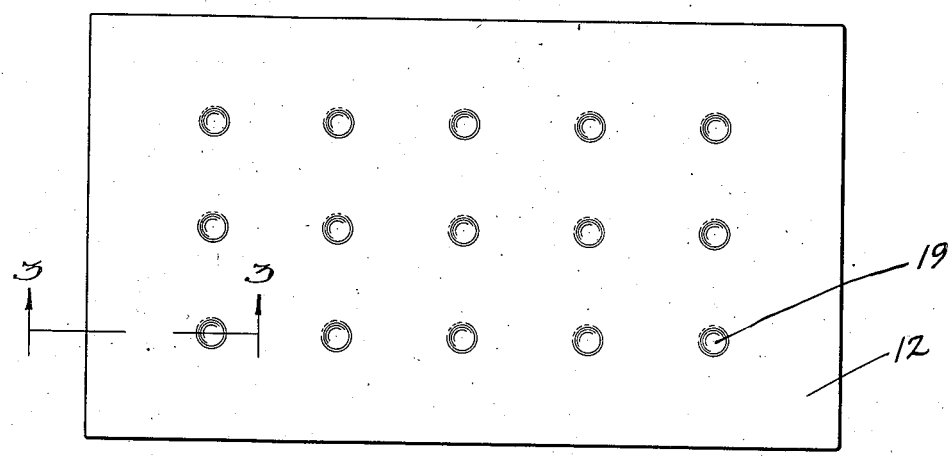
Fig. 1 is a plan view of the present cover.
Figure 2:
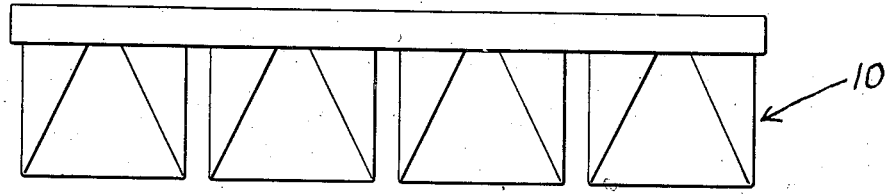
Fig. 2 is a side elevational view of a pan set illustrating the present cover coacting therewith.
Figure 3:
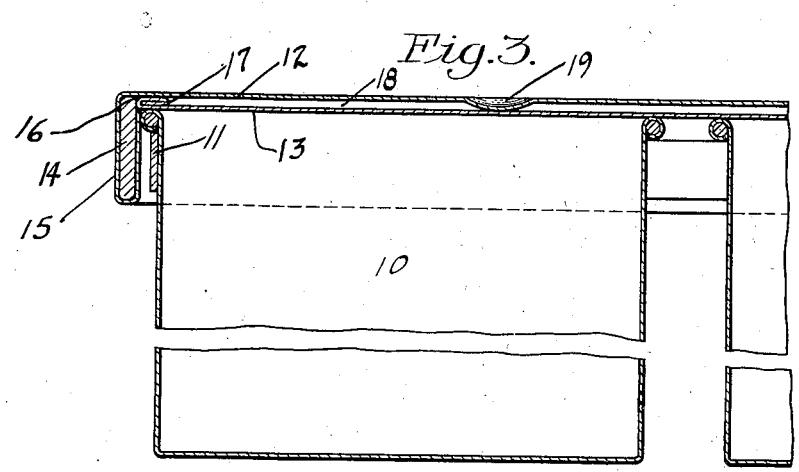
Fig. 3 is an enlarged fragmentary section taken on line 3—3 of Fig. 1.

The cover comprises a pair of metallic sheets 12 and 13, cooperating with a frame 14 adapted to surround the pan or pans coacting therewith. The top sheet 12, as shown in Fig. 3, is provided with flanges 15 which are turned downwardly and folded about the frame 14 in such a manner as to form a shoulder 16 opposing the underside of the body of the sheet 12. The lower sheet 13 is substantially coextensive in area with that of the underside of the top sheet 12 and is folded to provide a relatively thick marginal portion 17, which portion 17 is clamped and engaged between the shoulder 16 and the under side of the sheet 12. Thus the inner surfaces of the portions 17 and the opposed inner surfaces of the sheets 12 and 13 define an air cell or chamber 18. Bosses 19 may be stamped inwardly from the sheet 12 for contact with the opposite face of the sheet 13. In this manner the sheets 12 and 13 are maintained in spaced relation at portions thereof remote from the margin 17. It will also be obvious from the foregoing that a firm, rigid connection will result between the sheets 12 and 13, and the frame 14, without the use of rivets and similar fastening devices.

Figure 4:
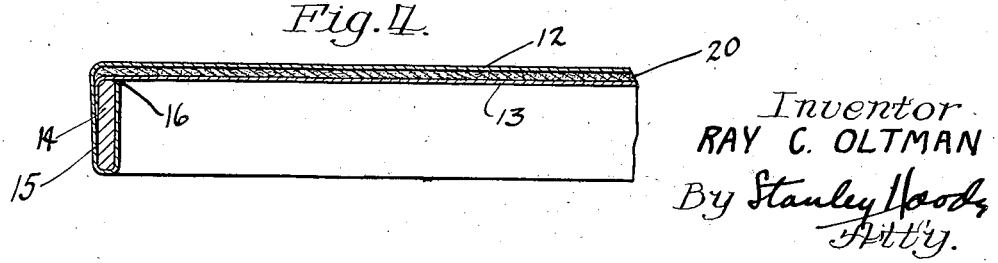
Fig. 4 is an enlarged fragmentary vertical section through a modified form of cover.

When desired, the space 18 may be filled with asbestos or other heat insulating material 20, as shown in Fig. 4. As shown in this view, the folded margin 17 as shown in Fig. 3, may be eliminated and in lieu thereof the edge of the sheet 13 may be folded about the upper edge of the frame 14, to be clamped between the inner surface of flange 15 and the outer face of the frame 14.

Figure 5:
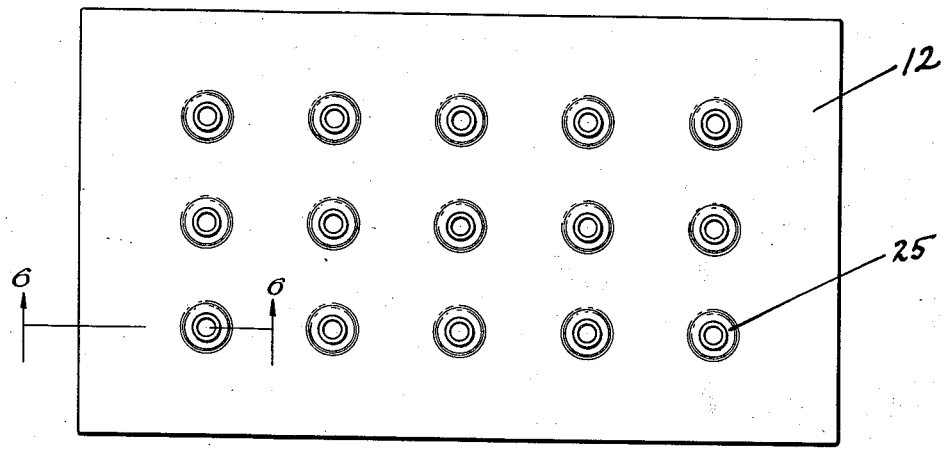
Fig. 5 is a plan view of a cover of further modified construction.
Figure 6:
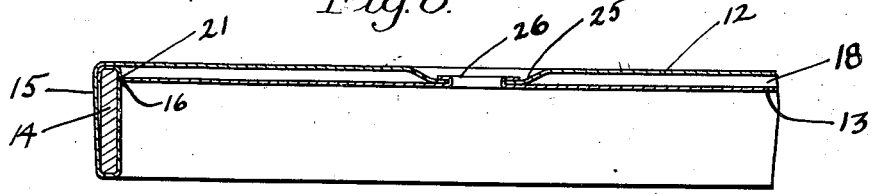
Fig. 6 is an enlarged fragmentary section taken on line 6—6 of Fig. 5.

Figs. 5 and 6 illustrate a further modified form of cover wherein that portion of the sheet 13 adjoining the upper edge of the frame 14 is bent downwardly as at 21 to create a bevelled shoulder between the frame 14 and the body of the sheet 13. This bevelled surface extends downwardly a distance sufficient to space the sheets 12 and 13 as effectively as though the folded margin portion 17, as shown in Fig. 3, were employed. In this modification, a more intimate connection between the sheets 12 and 13 is contemplated. It will be observed that this is accomplished by means of a rim 26 struck up from each of a series of perforations in the bottom sheet 13 clinched through corresponding perforated depressions 25 in the sheet 12. By disposing these perforations in registry with the spaces between pans of the set, complete circulation of heated air between the pans is obtainable.

What is claimed is:

1. A cover for a bakepan comprising a frame, a metallic sheet secured thereto at its edges, a second sheet adapted to coact with said first sheet, and means for securing said second sheet in fixed spaced relation to said first sheet including bosses stamped inwardly from the underside of said first sheet.

2. A cover for a bakepan comprising a frame, a metallic sheet secured thereto at its edges, a second sheet having its body positioned in a plane below the edges of said frame and adjoining said frame sloping upwardly to the frame edge.

3. A cover comprising a frame, a sheet coacting with said frame having its edges bent to encircle and embrace said frame, a second sheet having its body positioned in a plane below the edges of said frame and adjoining said frame sloping upwardly to the frame edge, the edge of said second sheet engaging the frame and terminating between the frame and the adjacent surface of the first sheet.

4. A cover comprising a frame, a sheet coacting with said frame having its edges bent to encircle and embrace said frame, a second sheet having its body positioned in a plane below the edges of said frame and adjoining said frame sloping upwardly to the frame edge, the edge of the first sheet engaging the frame terminating under the sloping portion aforesaid.

5. A cover for a bakepan set comprising a frame, a metallic sheet secured thereto at its edges, a second sheet adapted to coact with said first sheet, aligned perforations in said sheets one to the other including rims struck from the perforations in one sheet clinched through said perforations in the other sheet.

6. A cover for a bakepan set comprising a frame, a metallic sheet secured thereto at its edges, a second sheet adapted to coact with said first sheet, aligned perforations in said sheets, rims struck from the perforations in the lower sheet clinched through said perforations in the top sheet, and means for maintaining said sheets in spaced relation throughout the major area thereof.

RAY C. OLTMAN.